US011066006B2

(12) United States Patent
Kitazawa

(10) Patent No.: US 11,066,006 B2
(45) Date of Patent: Jul. 20, 2021

(54) VEHICLE LAMP

(71) Applicant: KOITO MANUFACTURING CO., LTD., Tokyo (JP)

(72) Inventor: Tatsuma Kitazawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/531,541

(22) Filed: Aug. 5, 2019

(65) Prior Publication Data

US 2020/0039419 A1 Feb. 6, 2020

(30) Foreign Application Priority Data

Aug. 6, 2018 (JP) .............................. JP2018-147921
Aug. 9, 2018 (JP) .............................. JP2018-150097

(51) Int. Cl.
*B60Q 1/14* (2006.01)
*F21S 41/65* (2018.01)
*F21W 102/17* (2018.01)

(52) U.S. Cl.
CPC .............. *B60Q 1/143* (2013.01); *F21S 41/65* (2018.01); *B60Q 2300/054* (2013.01);
(Continued)

(58) Field of Classification Search
CPC ........................... B60Q 2300/42; B60Q 1/085; B60Q 2300/41; B60Q 2300/312; B60Q 2300/054; B60Q 2300/056; B60Q 2300/314; B60Q 1/18; B60Q 2300/112; B60Q 2300/114; B60Q 2300/3321; B60Q 1/143; B60Q 2300/21; B60Q 2400/30; B60Q 2300/132; B60Q 2300/332; B60Q 2300/122; B60Q 2300/322; B60Q 2300/334; B60Q 1/1423; B60Q 2300/134; B60Q 2300/32;
(Continued)

(56) References Cited

U.S. PATENT DOCUMENTS 6,254,259 B1 7/2001 Kobayashi
8,525,445 B2 9/2013 Oishi et al.
(Continued)

FOREIGN PATENT DOCUMENTS

CA 2343795 C 4/2007
CN 1235913 A 11/1999
(Continued)

OTHER PUBLICATIONS

Office Action issued in corresponding U.S. Appl. No. 16/531,632, dated Jun. 8, 2020 (13 pages).
(Continued)

*Primary Examiner* — Monica C King
(74) *Attorney, Agent, or Firm* — Osha Bergman Watanabe & Burton LLP

(57) ABSTRACT

A vehicle lamp includes: a variable light distribution lamp capable of generating a beam having a variable intensity distribution; an infrared illumination device configured to irradiate a front; an infrared camera configured to image the front; and a light distribution controller configured to detect a snow particle based on an output of the infrared camera, generate a light distribution pattern in which a portion corresponding to the snow particle is shaded, and control the variable light distribution lamp.

15 Claims, 8 Drawing Sheets

(52) U.S. Cl.
CPC .... *B60Q 2300/312* (2013.01); *B60Q 2300/41* (2013.01); *B60Q 2300/42* (2013.01); *B60Q 2300/45* (2013.01); *F21W 2102/17* (2018.01)

(58) Field of Classification Search
CPC ........ B60Q 2300/331; B60Q 2300/333; B60Q 2300/116; B60Q 2300/142; B60Q 2300/337; B60Q 1/2603; B60Q 2300/144; B60Q 1/0023; B60Q 2300/324; B60Q 2300/335; B60Q 2300/45; B60Q 2300/47; B60Q 1/1438; B60Q 1/16; B60Q 1/20; B60Q 2300/336; B60Q 9/008; B60Q 1/0041; B60Q 1/0047; B60Q 1/0076; B60Q 1/02; B60Q 1/08; B60Q 1/10; B60Q 1/12; B60Q 1/14; B60Q 1/30; B60Q 1/32; B60Q 1/34; B60Q 1/44; B60Q 1/46; B60Q 1/503; B60Q 2200/38; B60Q 2300/05; B60Q 2300/052; B60Q 2300/128; B60Q 2300/14; B60Q 2300/305; B60Q 2300/31; B60Q 2400/00; H05B 47/19; H05B 47/10; H05B 47/105; H05B 47/18

See application file for complete search history.

(56) References Cited

U.S. PATENT DOCUMENTS

| | | | |
|---|---|---|---|
| 2008/0084165 | A1 | 4/2008 | Otsuka et al. |
| 2012/0286662 | A1 | 11/2012 | Jeong |
| 2013/0155704 | A1 | 6/2013 | Takagaki |
| 2014/0043805 | A1 | 2/2014 | Yamamura |
| 2014/0303853 | A1 | 10/2014 | Itoh et al. |
| 2015/0085514 | A1 | 3/2015 | Yagi |
| 2016/0167566 | A1 | 6/2016 | Tanaka et al. |
| 2016/0345401 | A1 | 11/2016 | Hessling-Von Heimendahl et al. |
| 2017/0136940 | A1 | 5/2017 | Toda et al. |
| 2017/0192224 | A1 | 7/2017 | Logiudice et al. |
| 2017/0253172 | A1 | 9/2017 | Canonne et al. |
| 2017/0267162 | A1 | 9/2017 | Remillard et al. |
| 2018/0043820 | A1 | 2/2018 | Murakami et al. |
| 2018/0113200 | A1 | 4/2018 | Steinberg et al. |
| 2018/0180246 | A1* | 6/2018 | Na .................. F21S 41/645 |
| 2018/0186278 | A1 | 7/2018 | Song et al. |
| 2020/0148094 | A1 | 5/2020 | Boehm et al. |
| 2020/0172029 | A1 | 6/2020 | Katz et al. |

FOREIGN PATENT DOCUMENTS

| | | | |
|---|---|---|---|
| CN | 102537807 | A | 7/2012 |
| CN | 102826038 | A | 12/2012 |
| CN | 102897083 | A | 1/2013 |
| CN | 103249597 | A | 8/2013 |
| CN | 103442179 | A | 12/2013 |
| CN | 103879337 | A | 6/2014 |
| CN | 103890563 | A | 6/2014 |
| CN | 105377629 | A | 3/2016 |
| CN | 105957057 | A | 9/2016 |
| CN | 106167101 | A | 11/2016 |
| CN | 205768952 | U | 12/2016 |
| CN | 106985640 | A | 7/2017 |
| CN | 106994884 | A | 8/2017 |
| CN | 107036034 | A | 8/2017 |
| CN | 107199943 | A | 9/2017 |
| CN | 107960069 | A | 4/2018 |
| EP | 2551155 | A2 | 1/2013 |
| JP | 2004145501 | A | 5/2004 |
| JP | 3747056 | B2 | 2/2006 |
| JP | 20080084165 | A | 4/2008 |
| JP | 2008-207738 | A | 9/2008 |
| JP | 20140043805 | A | 11/2012 |
| JP | 2015064964 | A | 4/2015 |
| JP | 2015110414 | A | 6/2015 |
| WO | 2018-055449 | A9 | 5/2018 |

OTHER PUBLICATIONS

Office Action issued in corresponding U.S. Appl. No. 16/531,632, dated Oct. 15, 2020 (16 pages).

Office Action issued in corresponding Chinese Application No. 201910722219.5, dated Mar. 1, 2021 (19 pages).

Search Report issued in corresponding French Application No. 1909009 with Partial English translation, dated Mar. 19, 2021 (7 pages).

Search Report issued in corresponding French Application No. 1909016 with Partial English translation, dated Mar. 23, 2021 (7 pages).

Office Action issued in Chinese Application No. 201910721035.7, dated Apr. 21, 2021 (21 pages).

L. Dezhi et al, "The Present Situation and Development of Intelligent Headlight of Automobile", China Illuminating Engineering Journal, vol. 28, No. 5, Oct. 2017 (7 pages).

M. A. Garcia-Garrido et al, "Real Time Driving-Aid System for Different Lighting Conditions, on Board a Road Vehicle", EECON 2006—32nd Annual Conference on IEEE Industrial Electronics, 2006, pp. 621-626 (6 pages).

R. de Charette et al, "Fast Reactive Control for Illumination Through Rain and Snow", 2012 IEEE International Conference on Computational Photography (11 pages).

* cited by examiner

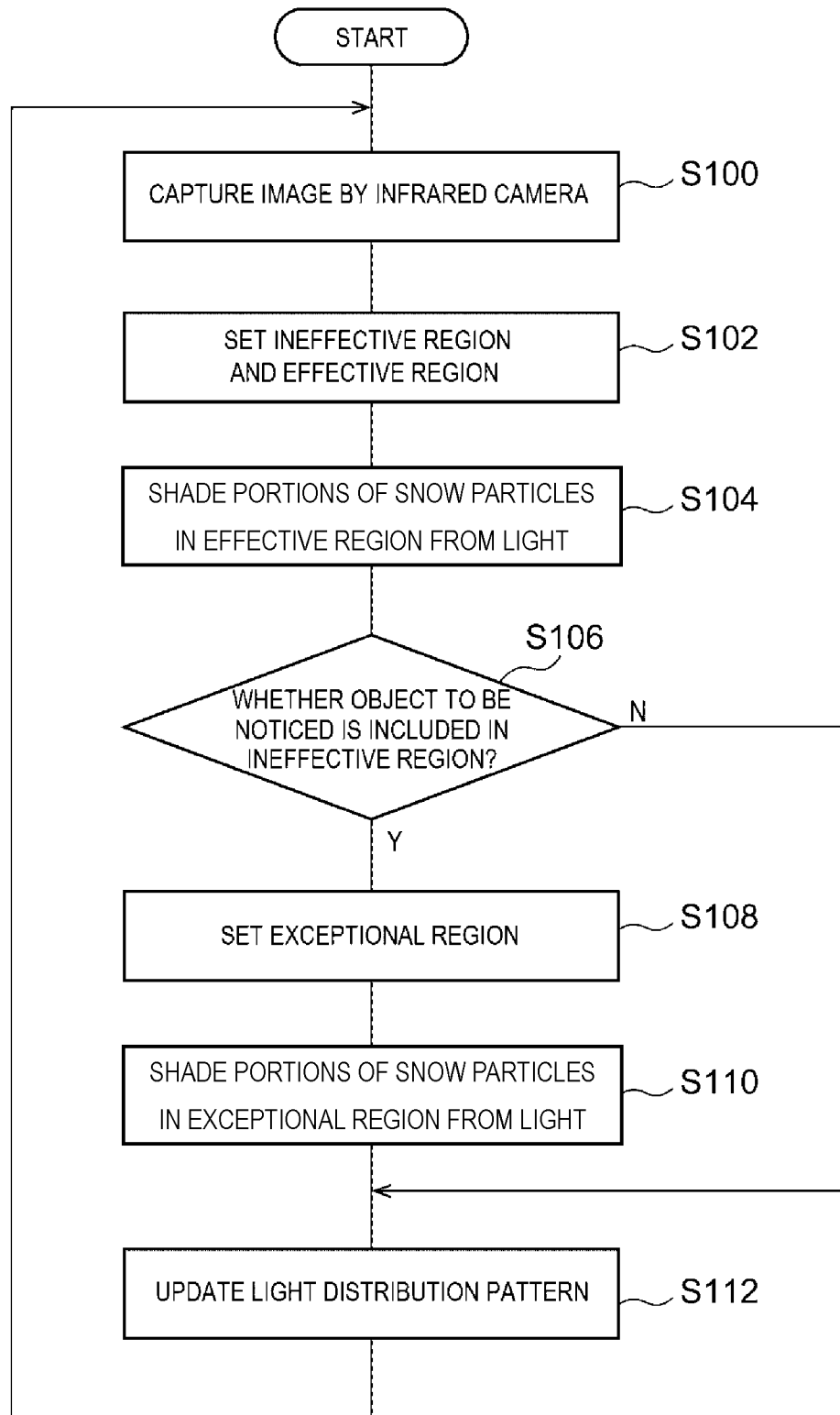

VEHICLE LAMP

CROSS-REFERENCE TO RELATED APPLICATIONS

This application is based on and claims priority under 35 USC 119 from Japanese Patent Applications No. 2018-147921 filed on Aug. 6, 2018 and No. 2018-150097 filed on Aug. 9, 2018, the contents of which are incorporated herein by reference.

TECHNICAL FIELD

The present invention relates to a vehicle lamp.

BACKGROUND

Vehicle lamps are important for traveling safely during nighttime or in a tunnel. When a driver prioritize visibility thereof and illuminate a wide range in front of a vehicle, there is a problem that glare is given to a driver of a preceding vehicle or an oncoming vehicle existing in front of the vehicle (hereinafter, referred to as a front vehicle) or a pedestrian.

In recent years, an adaptive driving beam (ADB) technique, which dynamically and adaptively controls a light distribution pattern based on a state around a vehicle, is proposed. The ADB technique enables to detect existence of the front vehicle or the pedestrian, and reduces the glare given to the driver of the front vehicle or to the pedestrian by, for example, dimming or extinguishing lighting in a region corresponding to the front vehicle or the pedestrian.

Examples of related art include: JP-A-2015-064964, JP-A-2012-227102 and JP-A-2008-094127.

When a head lamp is lighted during snowfall (or rainfall), there is a problem of difficulty for a driver to view forward due to reflection by snow particles and its glare to the driver.

The present invention is made in view of this circumstance, and an exemplary object of such an aspect is to improve visibility of the front of a vehicle during snowfall.

SUMMARY

An aspect of the present invention relates to a vehicle lamp. The vehicle lamp includes a variable light distribution lamp capable of generating beams having a variable intensity distribution; an infrared illumination device configured to irradiate a front; an infrared camera configured to image the front; and a light distribution controller configured to detect snow particles based on an output of the infrared camera, generate a light distribution pattern in which portions corresponding to the snow particles are shaded, and control the variable light distribution lamp.

Another aspect of the present invention also relates to a vehicle lamp. The vehicle lamp includes: a light distribution controller configured to generate a light distribution pattern in which portions corresponding to snow particles are shaded; and a variable light distribution lamp capable of generating beams having an intensity distribution corresponding to the light distribution pattern. In an ineffective region, the light distribution controller disables shading control based on the snow particles, or weakens a degree of shading.

Another aspect of the present invention is also a vehicle lamp. The vehicle lamp includes: a light distribution controller, configured to generate a light distribution pattern in which portions corresponding to snow particles are shaded; and a variable light distribution lamp capable of forming an illuminance distribution corresponding to the light distribution pattern. In an ineffective region, the light distribution controller disables shading control based on the snow particles, or weakens a degree of shading.

Any combinations of constituting elements described above, and implementations of the invention in form of methods, devices, systems, and the like are also effective as aspects of the present invention.

According to the present invention, the visibility of the front of the vehicle during snowfall can be improved.

BRIEF DESCRIPTION OF DRAWINGS

FIG. 8 is a flowchart of light distribution control according to an example.

DETAILED DESCRIPTION (Overview of Embodiments)

Figure 1:
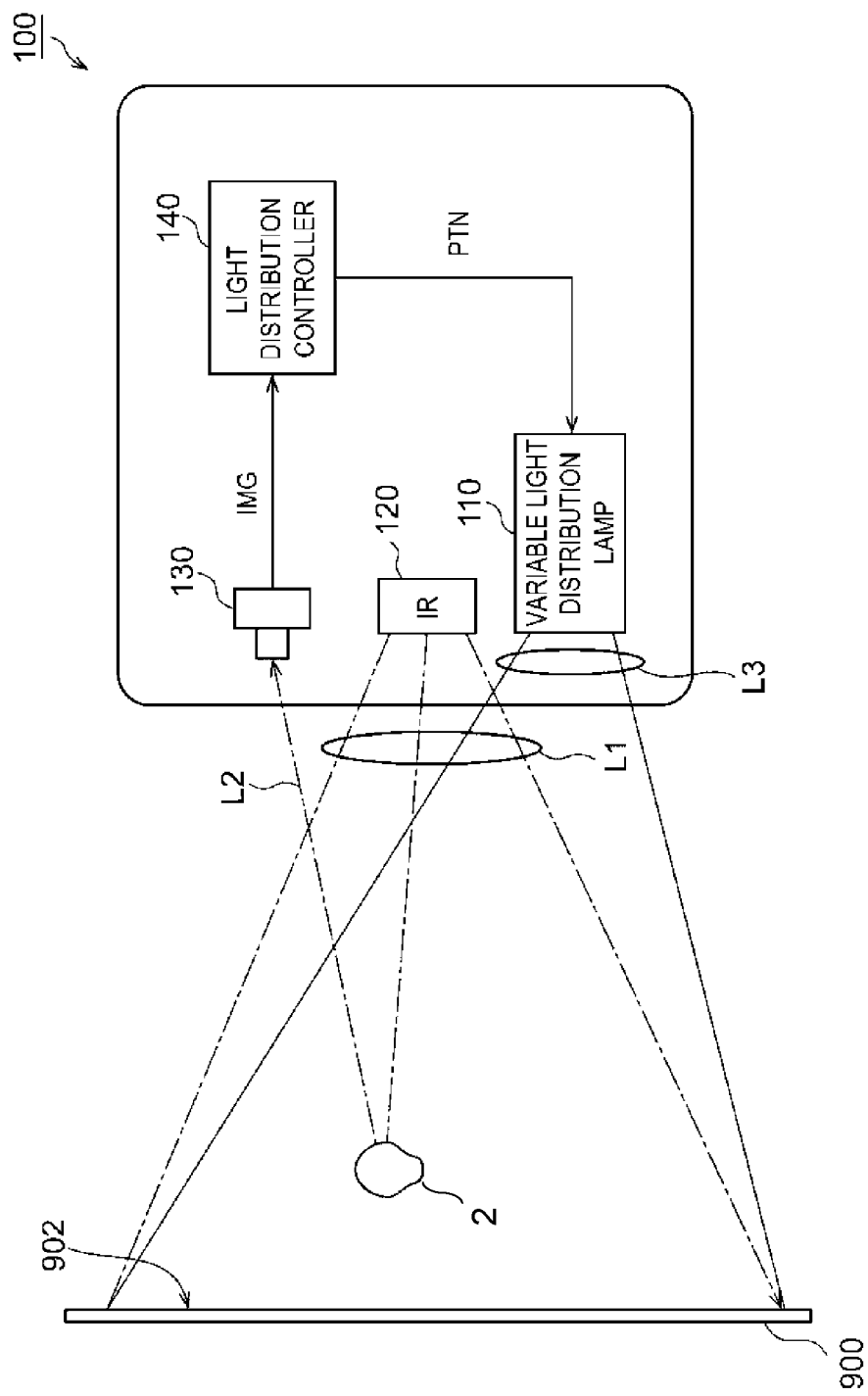
FIG. 1 is a block diagram of a vehicle lamp according to an embodiment.

In order to shade snow particles, it is necessary to detect the snow particles. When white (visible) probe light is used to detect the snow particles, the snow particles shine whitely each time the probe light is irradiated, resulting in a poor visual field. In order to prevent this problem, a vehicle lamp according to an embodiment disclosed in the present specification uses infrared rays as the probe light to detect the snow particles. Accordingly, it is difficult for a driver to recognize reflected infrared light caused by the snow particles. Therefore, the snow particles can be detected without deteriorating visibility of a front.

In addition, through using the infrared rays as the probe light, it is difficult for the driver to recognize the probe light even when the infrared rays are continuously irradiated. Therefore, it is possible to follow and detect snow particles moving at high speeds.

It is assumed that a virtual screen is located on an opposite side of snow particles in front of a vehicle. When portions corresponding to the snow particles are shaded, the shaded portions become dark on the screen, but the dark portions on the screen move in accordance with movement of the snow particles. As a result, the virtual screen flickers when the driver looks at this virtual screen, and a visual field in front of the vehicle is thus deteriorated. Therefore, when there is a portion functioning as the screen that generates the flickering in the visual field in front of the vehicle, shading control based on the snow particles may be disabled or a degree of shading may be weakened in such a region. Accordingly, the flickering can be inhibited.

In one embodiment disclosed in the present specification, a vehicle lamp includes: a light distribution controller, configured to generate a light distribution pattern in which portions corresponding to snow particles are shaded; and a variable light distribution lamp, which is capable of forming an illuminance distribution corresponding to the light distribution pattern. In an ineffective region, the light distribution controller disables shading control based on the snow particles, or weakens a degree of shading.

Embodiment

The above is an overview of the vehicle lamp. Hereinafter, the present invention will be described based on a preferred embodiment with reference to the drawings. The embodiment is not intended to limit the invention and all the features and combinations thereof described in the embodiment are not necessarily essential to the invention. The same or equivalent components, members, and processes shown in the drawings are denoted by the same reference numerals, and a repetitive description thereof will be omitted. In addition, the scale and shape of each part shown in each of the drawings are set for convenience to simplify the description, and are not to be interpreted as limitations unless otherwise specified. When the terms "first", "second" and the like are used in the present specification and claims, the terms are not intended to represent any order or importance, and are intended to distinguish one configuration from another.

FIG. 1 is a block diagram of the vehicle lamp according to the embodiment. A vehicle lamp 100 includes a variable light distribution lamp 110, an infrared illumination device 120, an infrared camera 130, and a light distribution controller 140. All of these members may be incorporated in the same housing, or some of the members may be provided outside the housing, in other words, provided on a vehicle side.

The variable light distribution lamp 110 is a white light source, which receives data indicating a light distribution pattern PTN from the light distribution controller 140, emits a beam L3 having an intensity distribution corresponding to the light distribution pattern PTN, and forms an illuminance distribution corresponding to the light distribution pattern PTN in front of the vehicle. A configuration of the variable light distribution lamp 110 is not particularly limited, and may include, for example, a semiconductor light source, such as a laser diode (LD) or a light emitting diode (LED), and a lighting circuit for driving and lighting the semiconductor light source. The variable light distribution lamp 110 may include a matrix-type pattern forming device, such as a digital mirror device (DMD) or a liquid crystal device, so as to form the illuminance distribution corresponding to the light distribution pattern PTN. The variable light distribution lamp 110 has a resolution enough to shade only the portions of the snow particles.

The infrared illumination device 120 is a probe light source that irradiates infrared probe light L1 to a front of the vehicle. The probe light L1 may be near-infrared light or light having a longer wavelength. The infrared camera 130 images reflected light L2 of the probe light L1 reflected by an object 2 in front of the vehicle. The infrared camera 130 should be sensitive to at least a wavelength region of the probe light L1, and is preferably insensitive to visible light.

The light distribution controller 140 dynamically and adaptively controls the light distribution pattern PTN supplied to the variable light distribution lamp 110 based on an image captured by the infrared camera 130 (hereinafter, referred to as a camera image IMG). The light distribution pattern PTN is recognized as a two-dimensional illuminance distribution of a white light irradiation pattern 902 formed by the variable light distribution lamp 110 on a virtual vertical screen 900 in front of the vehicle. The light distribution controller 140 can be configured by a digital processor, or may be configured by a combination of a microcomputer (including a CPU) and a software program, by a field programmable gate array (FPGA) or an application specified IC (ASIC), or the like.

The light distribution controller 140 detects the snow particles by image processing based on the camera image IMG obtained by the infrared camera 130. A detection algorithm of the snow particles is not particularly limited. The light distribution controller 140 may detect the snow particles based on a plurality of consecutive frames of the camera image IMG.

The light distribution controller 140 generates the light distribution pattern PTN in which the portions corresponding to the snow particles are shaded. "Shading a certain portion" includes a case where a luminance (illuminance) of the portion is set to zero and a case where the luminance (illuminance) of the portion is reduced.

Figure 2B:
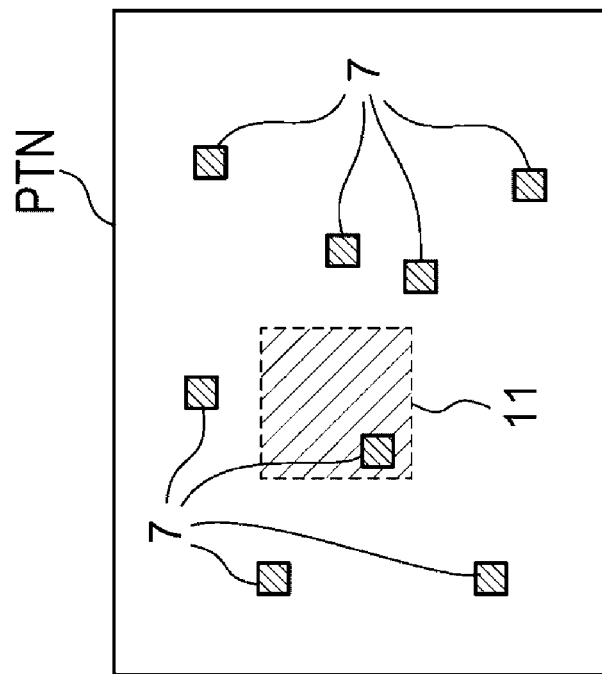
FIG. 2B depicts a light distribution pattern PTN.
Figure 2A:
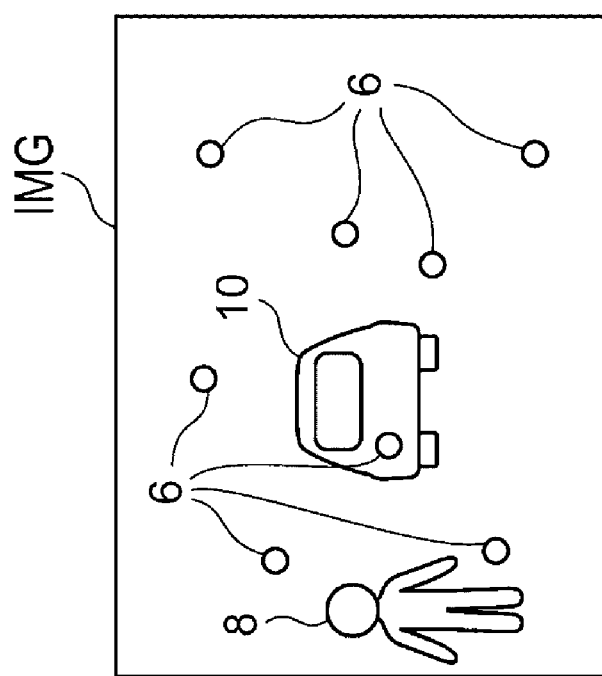
FIG. 2A depicts a camera image IMG.

The above is a basic configuration of the vehicle lamp 100. FIGS. 2A and 2B describe an operation of the vehicle lamp 100 of FIG. 1. FIG. 2A shows the camera image IMG, and FIG. 2B shows the light distribution pattern PTN corresponding to the camera image of FIG. 2A. Snow particles 6, a person 8, and a vehicle 10 are shown in the camera image IMG. The light distribution controller 140 detects the snow particles 6 from the camera image IMG and shades corresponding portions 7 of the light distribution pattern PTN.

The light distribution controller 140 may perform so-called ADB control, and in this case, when a target that should not be given glare to is detected, such as the vehicle 10, a corresponding portion 11 is also shaded.

The light distribution pattern PTN is updated at a rate of, for example, 30 fps or more, and the shaded portions 7 can be moved following the snow particles 6. Accordingly, reflected light of the snow particles 6 can be reduced, and visibility of a front can be improved.

Next, advantages of the vehicle lamp 100 will be described. When white (visible) probe light is used to detect the snow particles, the snow particles shine whitely and generate glare each time the probe light is irradiated, resulting in a poor visual field. According to the present embodiment, since infrared rays are used as the probe light, there is an advantage that the glare can be prevented.

Since the infrared rays are used as the probe light, there is an advantage that it is difficult for the driver to recognize the probe light even when the probe light is continuously irradiated. Therefore, it is possible to follow and detect snow particles moving at high speeds.

Figure 3:
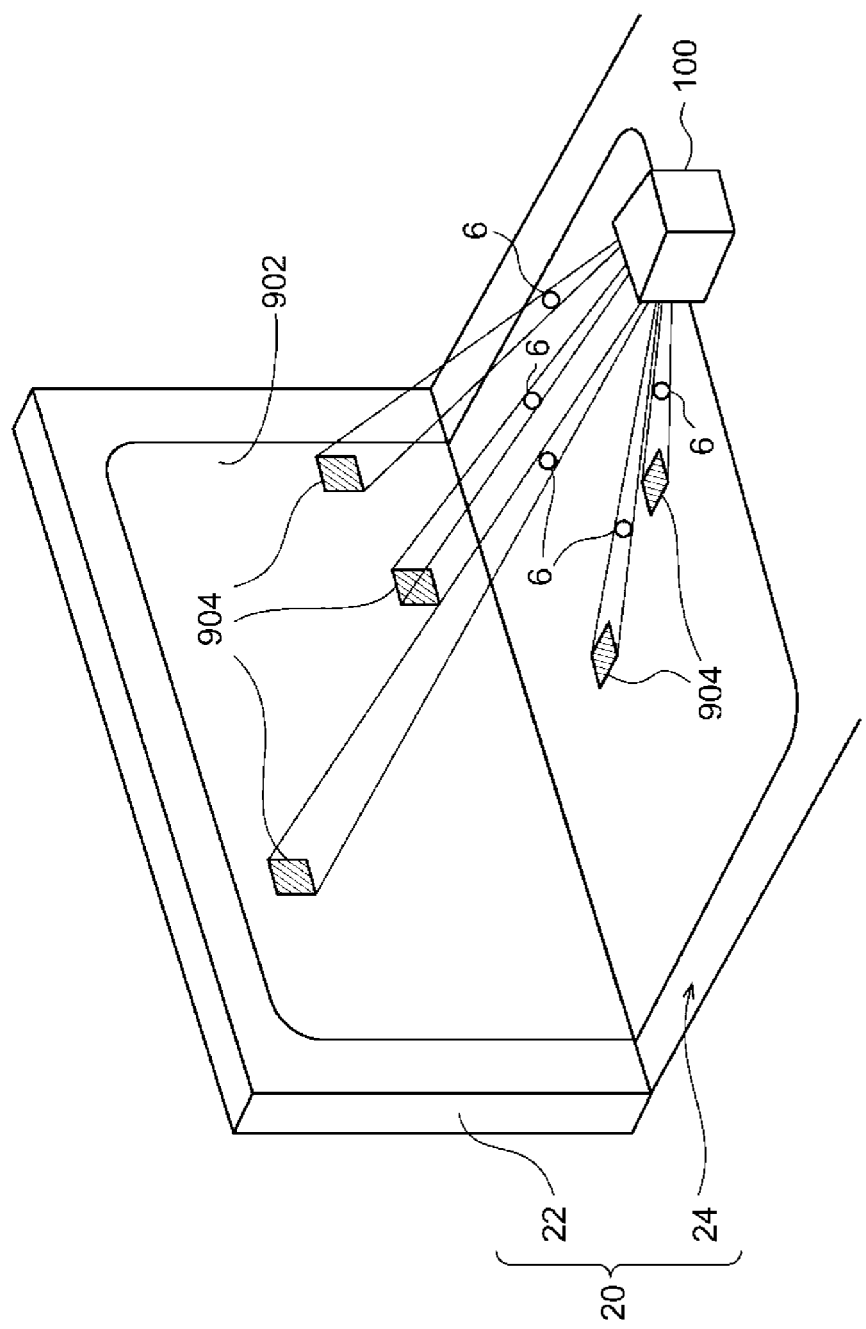
FIG. 3 illustrates a reduction in visibility accompanying shading control.

Although the shading control of the snow particles has the advantage of reducing glare caused by the reflection of the snow, under some situations, there is a possibility that the visibility of the front is reduced. FIG. 3 describes a reduction in the visibility accompanying the shading control. When there is an object that can be regarded as a screen, such as a wall (fence) 22 or a road surface 24 (collectively referred to by reference numeral 20), on a side opposite to the snow particles 6 in front of the vehicle, the irradiation pattern 902 is projected onto the object 20. When the portions corresponding to the snow particles 6 are shaded, dark spots 904, which are randomly distributed, are included in the irradiation pattern 902, thus the visibility is reduced. In addition, since the snow particles 6 move momentarily, the dark spots 904 also move momentarily, thus the irradiation pattern 902 projected onto the object 20 is flickered. This flickering further reduces the visibility of the front of the vehicle. This problem is not understood as a general recognition by those skilled in the art, and is uniquely recognized by the present inventors.

In order to solve this problem, when there is a portion functioning as the screen that generates the flickering in the visual field in front of the vehicle, the light distribution controller 140 disables the shading control based on the snow particles or weakens a degree of the shading in such a region (referred to as an ineffective region). By setting the ineffective region, the reduction in visibility caused by the dark spots can be inhibited.

Figure 4B:
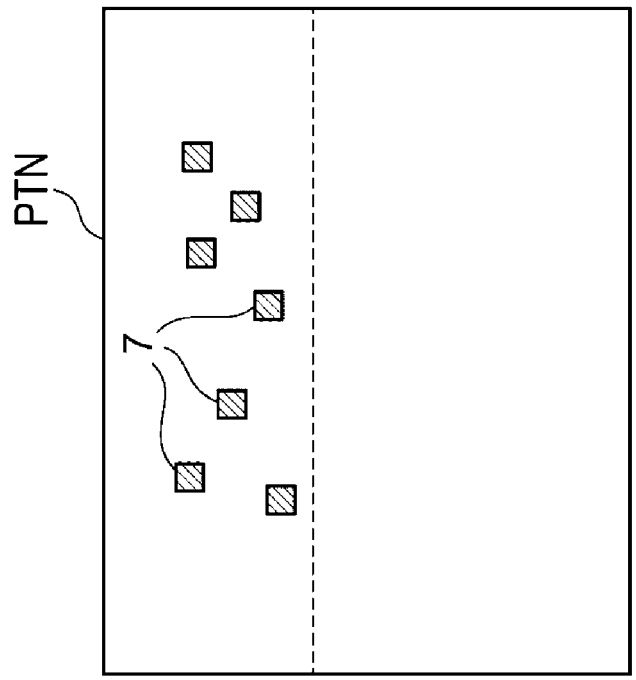
FIG. 4B depicts a light distribution pattern PTN.
Figure 4A:
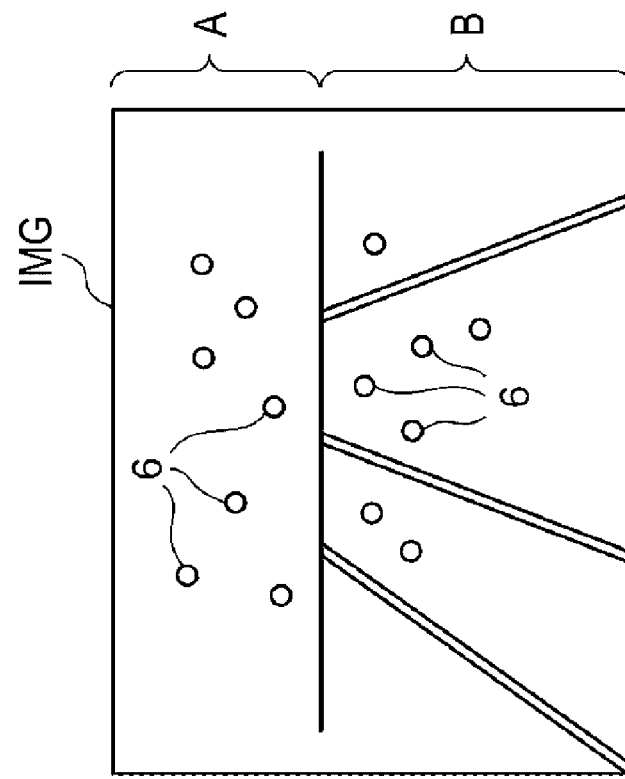
FIG. 4A depicts a camera image IMG.

FIGS. 4A and 4B describe the effective region and the ineffective region. FIG. 4A shows the camera image IMG, and FIG. 4B shows the light distribution pattern PTN. In FIG. 4A, a range B corresponding to a road surface is set as the ineffective region, and the other portion A is set as the effective region.

As shown in FIG. 4B, in the effective region A, the portions 7 corresponding to the snow particles 6 are shaded by the shading control. Meanwhile, in the ineffective region B, since the shading control is disabled, portions corresponding to the snow particles 6 are also irradiated with beams. Accordingly, the dark spots can be prevented from being projected onto the screen object such as the road surface.

Figure 5A:
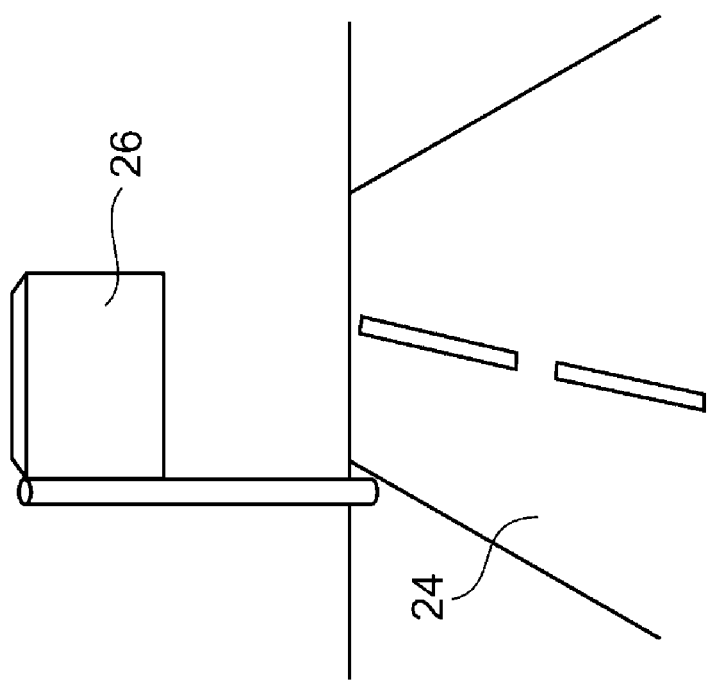
FIG. 5A depicts an exemplary visual field in front of a vehicle.
Figure 5B:
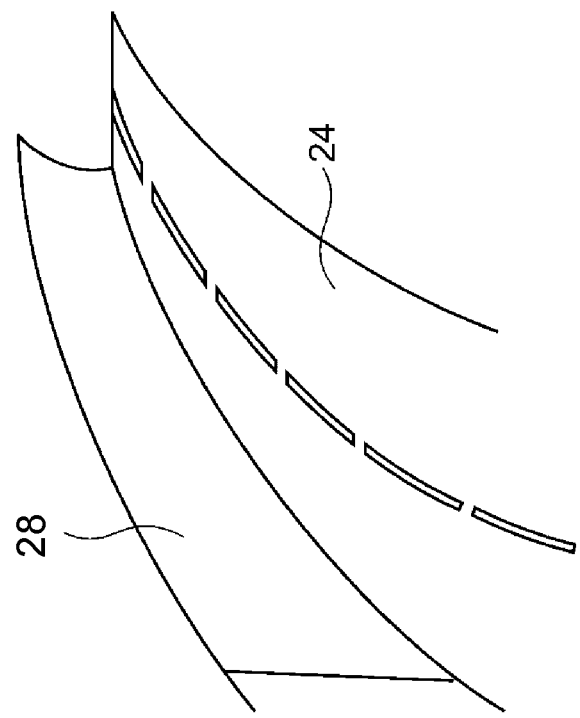
FIG. 5B depicts an exemplary visual field in front of a vehicle.

The ineffective region may be set fixedly, or may be dynamically or adaptively changed depending on a situation in front of the vehicle. FIGS. 5A and 5B show exemplary front views of the vehicle. As shown in FIG. 5A, the road surface 24 is a typical screen. A road sign 26, a signboard, and the like also function as screens. As shown in FIG. 5B, a side wall 28 of a highway can also function as a screen.

The light distribution controller 140 detects a range including an object that can function as a screen (hereinafter, referred to as a screen object) by the image processing, and sets this region as the ineffective region. Here, since the screen object reflects the probe light irradiated by the infrared illumination device 120, the screen object tends to be bright in the image IMG captured by the infrared camera 130. Therefore, the light distribution controller 140 may set a region having a high luminance as the ineffective region in the image IMG. On the other hand, a range that does not include the screen object, in other words, a range in which reflection is weak, may be detected, and the range may be set as a region in which the shading control is effective (hereinafter, referred to as the effective region).

In a case where a screen object is sufficiently far away, since a contrast ratio of the dark spots 904 and portions irradiated with light around the dark spots 904 is reduced, the visibility may not be affected. Therefore, in such a case, a range including the distant screen object can be regarded as an effective area. A camera having sensitivity to a visible region different from the infrared camera 130 may be added, and the ineffective region and the effective region may be set using an image of this camera.

Figure 6:
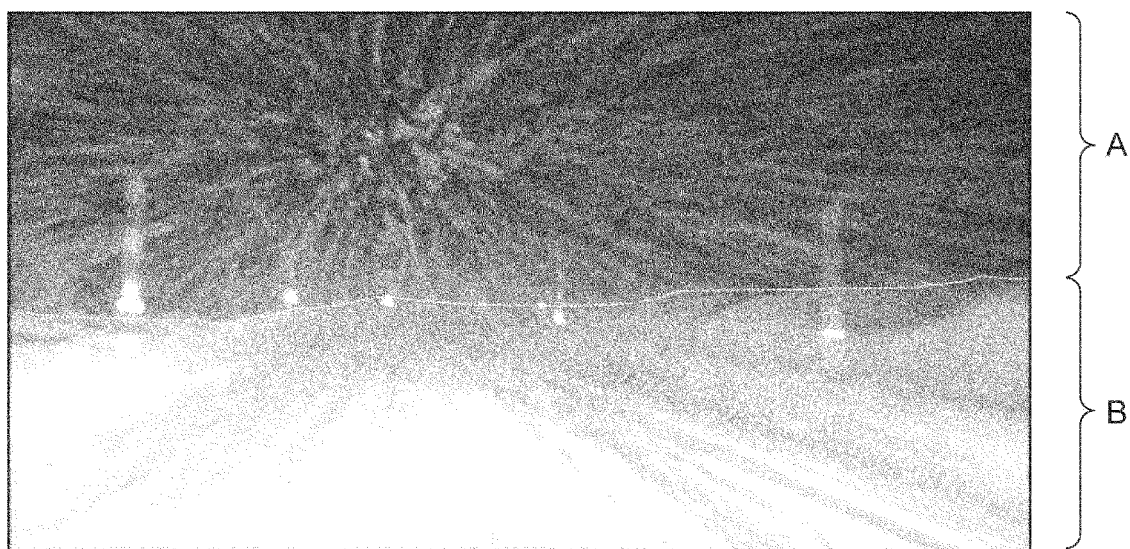
FIG. 6 illustrates setting of the ineffective region based on a contrast ratio.

Alternatively, the effective region and the ineffective region may be set based on a contrast ratio of the image IMG of the camera. FIG. 6 describes setting of the ineffective region based on the contrast ratio. FIG. 6 shows the camera image IMG. A sky appears above the camera image IMG, and there is no screen object. In a range A, luminance (pixel value) of the snow particles 6 is high, and luminance of a surrounding region thereof is very low since there is not reflection. Therefore, a ratio (or difference) between a peak and a bottom of the luminance, that is, a contrast ratio, is large.

On the contrary, a road surface, that is, a screen object, is included on a lower side in the camera image IMG. In a range B, the luminance of the snow particles 6 is high, and the luminance of the surrounding region in the camera image is also increased to some extent due to reflection of the screen object such as the road surface, and the ratio between the peak and the bottom of the luminance, that is, the contrast ratio, is small. From the above, the ineffective region and the effective region can be dynamically set through using the contrast ratio.

A situation in which a delineator is present in the ineffective region is considered. When the shading control is disabled, the delineator is hidden in reflection of snow, and visibility of the delineator is reduced. Therefore, when a delineator is detected in the ineffective region by the image processing, a local portion including the delineator may be set as an exceptional region, and the shading control may be enabled in the exceptional region.

Figure 7B:
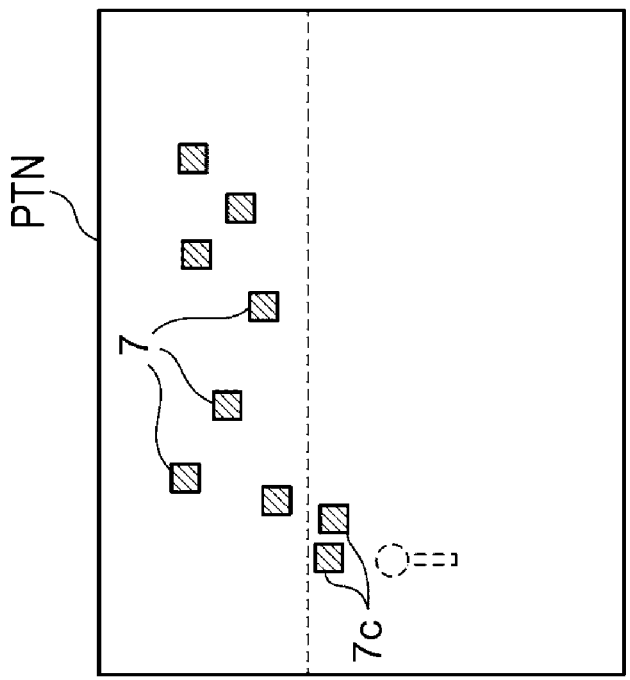
FIG. 7B depicts a light distribution pattern PTN.
Figure 7A:
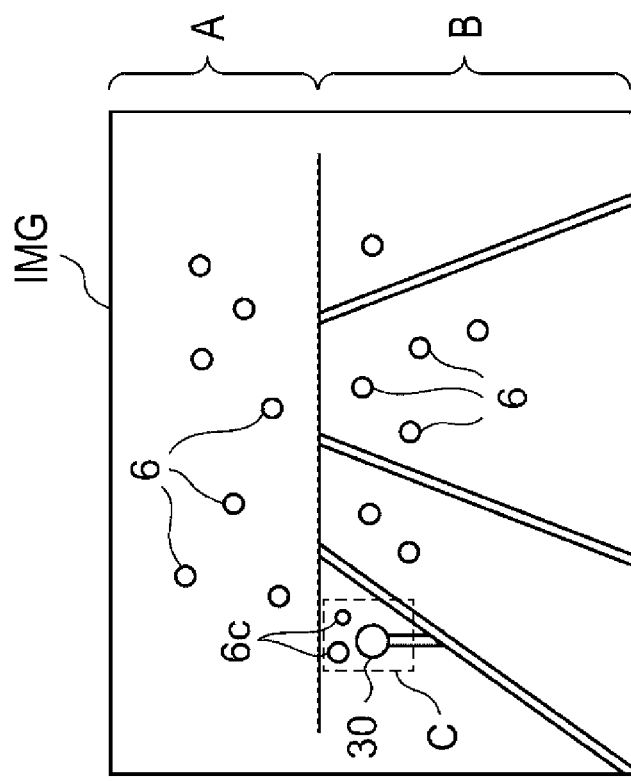
FIG. 7A depicts a camera image IMG.

FIGS. 7A and 7B describe control related to the exceptional region. FIG. 7A shows the camera image IMG, and FIG. 7B shows the light distribution pattern PTN. As shown in FIG. 7A, a portion including the road surface is set as the ineffective region B, and the other portion is set as the effective region A. When a delineator 30 is detected in the ineffective region B by the image processing, a local range including the delineator 30 and a surrounding region thereof is set as an exceptional region C.

As shown in FIG. 7B, in the effective region A, the portions 7 corresponding to the snow particles 6 are shaded. Meanwhile, in the ineffective region B, portions corresponding to the snow particles 6 are not shaded, but portions 7c corresponding to snow particles 6c included in the exceptional region C are shaded. As a result, the delineator 30 can be irradiated with beams while inhibiting reflection (glare) of the snow particles 6c around the delineator 30.

Objects that should be detected by the driver is not limited to the delineator, and may include a pedestrian, a preceding vehicle, an oncoming vehicle, a driving sign, and the like. When these objects are detected in the ineffective region by the image processing, the pedestrian, the preceding vehicle, the oncoming vehicle, and the driving sign can be prevented from being hidden in the reflection (glare) of the snow through enabling the shading control in local portions including the objects.

FIG. 8 is a flowchart of light distribution control according to an example. An image is captured by the infrared camera (S100). Then, the ineffective region and the effective region are set based on the camera image IMG (S102). Subsequently, when the snow particles in the effective region are detected, the portions of the snow particles are shaded (S104). Further, it is determined whether or not an object to be noticed, such as a delineator, is included in the ineffective region (S106). If such an object is not included (N in S106), the light distribution pattern PTN is updated (S112). If such an object is included (Y in S106), a surrounding region of the object is set as the exceptional region (S108). When snow particles in the exceptional region are detected, portions of the snow particles are shaded (S110), and the light distribution pattern PTN is updated (S112).

The present invention was described above based on the embodiment. It is to be understood by those skilled in the art that this embodiment is only an example, and various modifications can be made to combinations of respective components and respective processing processes, and such modifications are also within the scope of the present invention. Hereinafter, such modifications will be described.

(Modification 1)

In the embodiment, the setting of the ineffective region is performed dynamically, but the present invention is not limited thereto. Since the road surface 24 is located at approximately the same position with respect to the vehicle, a range corresponding to the road surface 24 may be set as a fixed ineffective region.

On the other hand, there is a high possibility that a background of a region above a visual field irradiated with high beams is a space (sky) without screen objects. Therefore, the portion may be set as a fixed effective region.

(Modification 2)

Although the shading control of the snow particles was described in the embodiment, raindrops may also be subjected to the shading control.

(Modification 3)

In the embodiment, the infrared rays are used as the probe light, but the present invention is not limited thereto. It is also possible to use the beam L3 emitted by the variable light distribution lamp 110 as the probe light to detect the snow particles. In this case, glare is given to the driver if irradiation time of the probe light is long, so that emission time of the probe light may be shortened to such a degree that the reflected light L2 cannot be detected by the driver. Even in a case where the beam L3 is used as the probe light, control for dividing the effective region into the ineffective region is enabled, and a corresponding effect can be obtained.

Although the present invention was described with specific words and phrases based on the embodiment, the embodiment merely shows an aspect of principles and applications of the present invention, and various changes of modifications and configurations may be made in the embodiment without departing from the inventive concept of the invention as defined in the claims.

100 Vehicle Lamp
110 Variable Light Distribution Lamp
120 Infrared Illumination Device
130 Infrared Camera
140 Light Distribution Controller
L1 Probe Light
L2 Reflected Light
L3 Beam

What is claimed is:

1. A vehicle lamp, comprising:
a variable light distribution lamp capable of generating a beam having a variable intensity distribution;
an infrared illumination device configured to irradiate a front;
an infrared camera configured to output an image of the front; and
a light distribution controller configured to detect a snow particle on the image, generate a light distribution pattern in which a portion corresponding to the snow particle is shaded, and control the variable light distribution lamp,
wherein the light distribution controller updates the light distribution pattern in which the shaded portion corresponding to the snow particle follows a movement of the snow particle.

2. The vehicle lamp according to claim 1, wherein, in an ineffective region, the light distribution controller disables shading control based on the snow particle, or weakens a degree of shading.

3. A vehicle lamp, comprising:
a camera that captures an image of a front;
a light distribution controller configured to generate a light distribution pattern in which a portion corresponding to a snow particle is shaded, wherein the snow particle is detected on the image; and
a variable light distribution lamp capable of generating a beam having an intensity distribution corresponding to the light distribution pattern,
wherein, in an ineffective region, the light distribution controller disables shading control based on the snow particle, or weakens a degree of shading, and
wherein the light distribution controller updates the light distribution pattern in which the shaded portion corresponding to the snow particle follows a movement of the snow particle.

4. The vehicle lamp according to claim 2, wherein the ineffective region includes a road surface and/or a wall surface.

5. The vehicle lamp according to claim 3, wherein the ineffective region includes a road surface and/or a wall surface.

6. The vehicle lamp according to claim 2, wherein the ineffective region is dynamically set corresponding to a situation in front of a vehicle.

7. The vehicle lamp according to claim 3, wherein the ineffective region is dynamically set corresponding to a situation in front of a vehicle.

8. The vehicle lamp according to claim 4, wherein the ineffective region is dynamically set corresponding to a situation in front of a vehicle.

9. The vehicle lamp according to claim 5, wherein the ineffective region is dynamically set corresponding to a situation in front of a vehicle.

10. The vehicle lamp according to claim 6, wherein the ineffective region is a low contrast region in an image captured by a camera.

11. The vehicle lamp according to claim 7, wherein the ineffective region is a low contrast region in an image captured by a camera.

12. The vehicle lamp according to claim 8, wherein the ineffective region is a low contrast region in an image captured by a camera.

13. The vehicle lamp according to claim 9, wherein the ineffective region is a low contrast region in an image captured by a camera.

14. The vehicle lamp according to claim 2, wherein when a delineator is detected in the ineffective region, the light distribution controller enables the shading control based on the snow particle in a range corresponding to the delineator.

15. The vehicle lamp according to claim 2, wherein when an object to be noticed by a driver is detected in the ineffective region, the light distribution controller enables the shading control based on the snow particle in a local range including the object.

* * * * *